Figure 1:
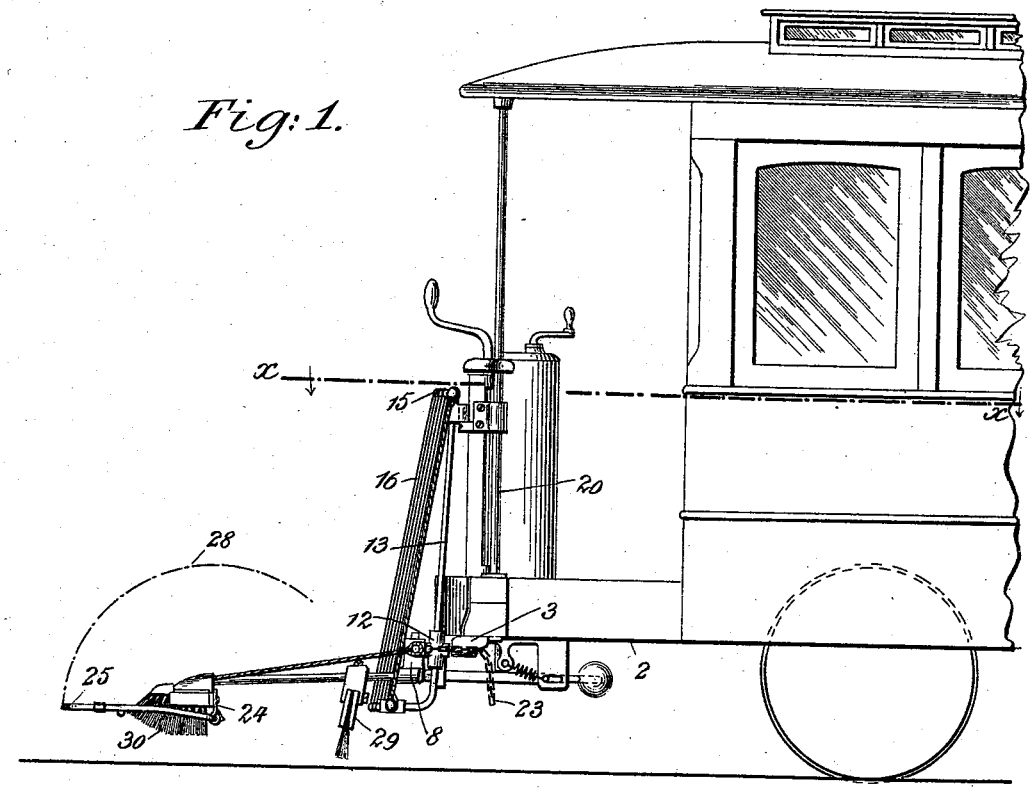

(No Model.) 2 Sheets—Sheet 1.

D. O'MAHONY.
CAR FENDER.

No. 542,276. Patented July 9, 1895.

WITNESSES:
John A. Rennie
Percy T. Griffiths

INVENTOR
Daniel O'Mahony
BY Edgar Tate & Co
ATTORNEYS (No Model.) 2 Sheets—Sheet 2.
D. O'MAHONY.
CAR FENDER.
No. 542,276. Patented July 9, 1895.
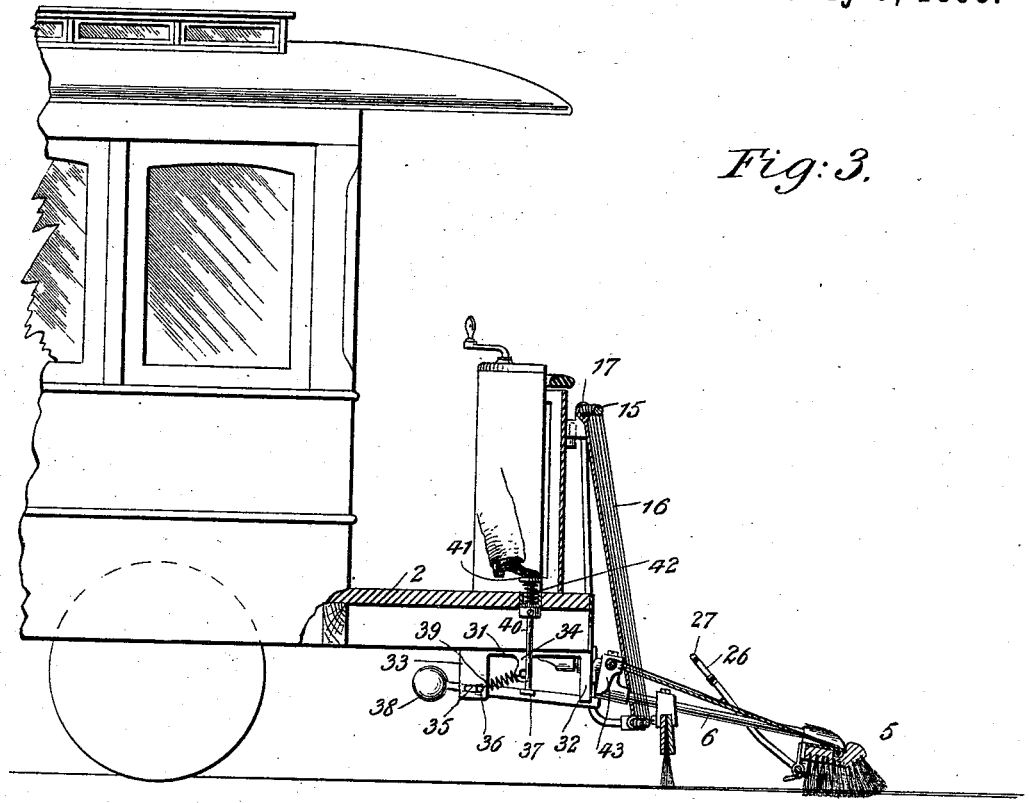
Fig: 3.
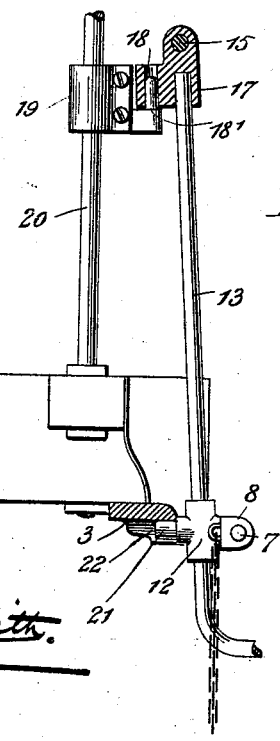
Fig: 4.
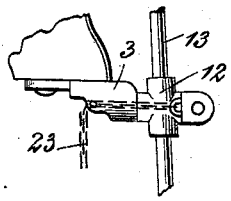
Fig: 5.
WITNESSES:
John A. Rennie
Percy T. Griffith
INVENTOR
Daniel O'Mahony
BY
Edgar Tate & Co
ATTORNEYS 3. The combination, with the front platform of a car, of a main fender or guard frame the inner end of which consists of a shaft pivotally connected with the said platform and provided centrally thereof with a shoulder rigidly secured thereto, a lever pivotally supported beneath the platform, the forward end of which is adapted to abut against said shoulder and hold the forward end of the fender or guard frame above or adjacent to the track, and a rod or bolt extending through the platform in contact with said lever and adapted to be operated from the platform to release its connection with said shoulder and allow the fender or guard to drop to and come in contact with the track, substantially as shown and described.

4. The combination, with a car, of a main fender or guard pivotally connected at its inner end with an auxiliary fender or guard removably connected with the car and arranged substantially vertical in front thereof, said main fender or guard being adapted to be folded vertically or projected in front of the car in connection with or adjacent to the tracks and carrying at its forward end a supplemental fender pivotally connected therewith and adapted to be folded thereon or projected in front thereof, substantially as shown and described.

5. The combination with a car, of an auxiliary fender or guard suspended from the top of the dash-board of the car and removable therefrom, the hangers on the bottom of the platform having grooves or recesses therein, the projections or lugs on said fender adapted to enter said grooves or recesses, a main fender pivotally connected at its inner end to said auxiliary fender and a supplemental fender adapted to be folded on the main fender, substantially as described.

6. The combination, with a car, of a main fender or guard pivotally connected at its inner end with an auxiliary fender or guard which is removably connected with the car near the top of the dash-board and suspended therefrom and provided near its lower end with projections or lugs adapted to enter grooves or recesses formed in hangers connected with the bottom of the platform, and said main fender or guard being provided at its front end with a supplemental fender pivotally connected therewith and adapted to be folded thereon or projected in front thereof in contact with or adjacent to the track, substantially as shown and described.

7. The combination, with a car, of an auxiliary fender removably supported near the top of the dash-board and suspended in front of the car, a main fender or guard pivotally connected with said auxiliary fender a short distance above the lower end thereof by means of a shaft which forms the rear part of the frame of said main fender or guard, a shoulder rigidly secured to said shaft, a lever pivotally connected with the platform of the car, one end of which is adapted to come in contact with said shoulder or projection and the other end of which is provided with a weight, a spring connected with said lever and with a hanger connected with the platform, adapted to hold the forward end of said lever in contact with said shoulder or projection, and the front end of the main fender or guard above the track, and means for operating said lever and breaking the connection thereof with said shoulder and permitting the fender or guard to drop in contact with the track, substantially as shown and described.

8. The combination, with a car, of an auxiliary fender or guard pivotally supported near the top of the dash board and removable therefrom and extending downward below the platform, a main fender or guard pivotally connected with said auxiliary fender and adapted to be folded in front thereof or projected in front of the car adjacent to the track, a supplemental fender or guard pivotally connected with the forward end of the main fender and adapted to be folded thereon or projected forward in front of the main fender or guard, and a series of brushes or sweepers connected with said main fender or guard and adapted to be brought in contact with the track, substantially as shown and described.

9. The combination of a car, of an auxiliary fender pivotally supported near the top of the dash board and removable therefrom and extending downward below the platform, a main fender or guard pivotally connected with said auxiliary fender and adapted to be folded in front thereof or projected in front of the car adjacent to the track, a supplemental fender or guard pivotally connected with the forward end of the main fender and adapted to be folded thereon or projected forward in front of the main fender or guard, and a series of brushes or sweepers connected with said main fender or guard and adapted to be brought in contact with the track, a lever pivotally supported beneath the platform of the car, the rear end of which is weighted and the front end of which is adapted to come in contact with and abut against a shoulder formed on the rear end of the main fender or guard and hold the same above the track, and means for operating said lever, consisting of a rod or bar extending vertically therefrom through the platform, whereby the connection between the lever and the shoulder may be broken and allow the main fender or guard to drop in contact with the track, substantially as shown and described.

In testimony that I claim the foregoing as my invention I have signed my name, in presence of two witnesses, this 2d day of April, 1895.

DANIEL O'MAHONY.

Witnesses:
 PERCY T. GRIFFITH,
 C. GERST.

UNITED STATES PATENT OFFICE.

DANIEL O'MAHONY, OF JERSEY CITY, NEW JERSEY.

CAR-FENDER.

SPECIFICATION forming part of Letters Patent No. 542,276, dated July 9, 1895.

Application filed April 4, 1895. Serial No. 544,394. (No model.)

*To all whom it may concern:*

Be it known that I, DANIEL O'MAHONY, a subject of the Queen of Great Britain, residing at Jersey City, county of Hudson, and State of New Jersey, have invented certain new and useful Improvements in Car-Fenders, of which the following is a specification, reference being had to the accompanying drawings, forming a part thereof, in which similar numerals of reference indicate corresponding parts in all the figures.

This invention relates to fenders or guards for tramway or other cars, and the object thereof is to provide an effective device of this class which, while combining simplicity in construction and operation, does not change or render necessary alterations in the cars as now constructed, and which will prevent, or materially decrease, the injurious effects of a collision with a person or other object and render the taking of life or serious maiming of a person in such accidents impossible.

The invention is fully disclosed in the following specification, of which the accompanying drawings form a part, in which—

Figure 2:
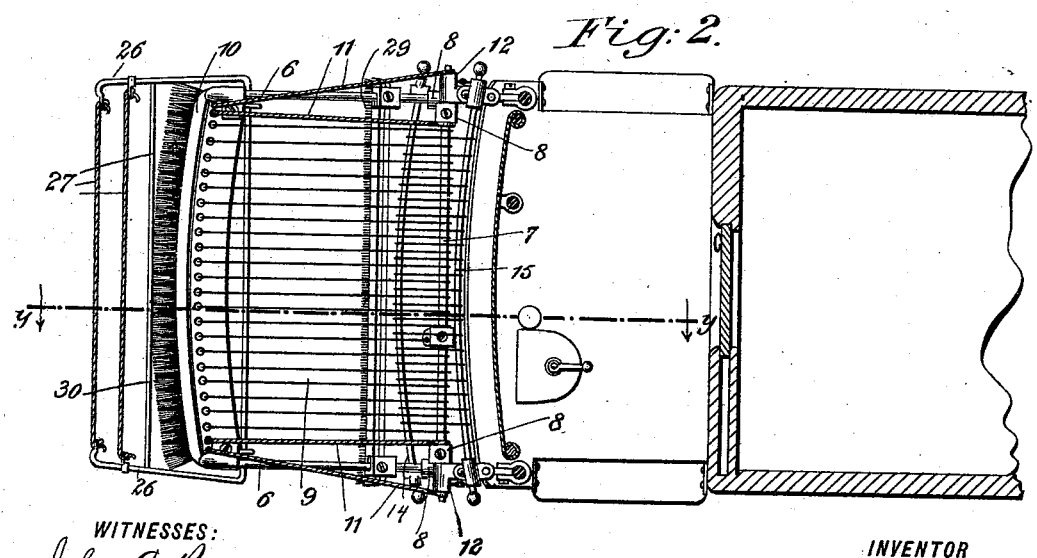

Figure 1 represents a section of a car and the platform thereof provided with my improved fender or guard with one side thereof cut away to better show the construction; Fig. 2, a section on the line $x\,x$ of Fig. 1; Fig. 3, a section on the line $y\,y$ of Fig. 2, and Figs. 4 and 5 details of the construction.

Referring to the drawings, the numeral 2 designates the platform of a car, to the bottom of which is secured, at each side thereof, hangers 3. (Best shown in Figs. 1 and 4.)

The fender or guard proper consists of a frame having the forward end piece 5, composed of wood or other preferred material, the side rods or bars 6, rigidly secured thereto, and the rear end bar or shaft 7, the side bars 6 and the rear end bar or shaft being rigidly connected by means of corner-blocks 8, which have upwardly and forwardly projecting arms or extensions provided for this purpose, the side bars being connected with the forward extensions and the rear end bar or shaft with the upper extensions, as shown in Figs. 1 and 2, and a body portion of wire or rods 9, connected with the front end piece or a metal plate secured thereon and extended backwardly and secured to the rear end bar or shaft 7.

An ordinary wire network may be substituted for these wires or rods, if desired, and at each side are heavy wires or rods 11 to give strength and stability to the body of the fender, said wires or rods 11 being secured at one end to the front piece of the fender and at the other to the rear end bar or shaft 7, as best shown in Fig. 2.

The rear end shaft or bar of the fender passes through the corner pieces 8 at each side and are journaled or mounted in heads or blocks 12, which are supported by the side bars 13, which constitute part of the frame of an auxiliary guard or fender, having also a bottom bar 14 connected with said side bars, a top bar 15, and a body of vertical rods 16, for which may be substituted an ordinary wire network, if desired.

The top and side bars of the auxiliary fender or guard are united by means of corner-blocks 17, (best shown in Figs. 3 and 4,) each of which is provided with an inwardly-directed projection 18, having a vertical bore designed to receive a corresponding upwardly-directed pivot or support 18', connected with a bracket attachment 19, secured to vertical rods 20, secured to the platform of the car and to the top of the dashboard at each side thereof. The heads or blocks 12, supported on the rods 13, and in which are journaled the ends of the inner shaft 7 of the main fender-frame, are provided with inwardly-directed lugs or projections 21, adapted to enter corresponding slots or projections 22, formed in the hangers 3, and as thus constructed it will be seen that the main frame is pivotally supported in said heads or blocks and the inner shaft thereof is revoluble therein, and that both of said frames together constitute a combined fender and guard, which is supported by the bracket attachments 19, connected with the rods 20, and a chain 23, Figs. 1 and 5, is secured at one or both sides to the block or blocks 12 and adapted to be connected with a hook or projection formed on the hanger 3 to secure the fender-frame from forward displacement when the same is in operation.

Pivotally connected to hangers 24, secured at each end of the front 10 of the fender or guard, is a supplemental fender or guard 25, consisting of side wires or rods 26 and cross bars or rods 27, as clearly shown in Figs. 1 and 2, and it will be observed that this sup-